350-96.24          SR
       XR    3,615,313

United State

[11] 3,615,313

| [72] | Inventor | Roland A. Phaneuf |
|---|---|---|
|  |  | Sturbridge, Mass. |
| [21] | Appl. No. | 831,523 |
| [22] | Filed | June 9, 1969 |
| [45] | Patented | Oct. 26, 1971 |
| [73] | Assignee | American Optical Corporation |
|  |  | Southbridge, Mass. |

[54] METHOD OF MAKING OPTICAL FIBERS, IMAGE-TRANSFER DEVICES
3 Claims, 6 Drawing Figs.

[52] U.S. Cl. .................................................. 65/4,
                  65/DIG. 7, 65/13, 161/176, 350/96 B
[51] Int. Cl. .................................................. C03b 23/20
[50] Field of Search .................................................. 264/176 F;
         65/4, DIG. 7, 13; 161/175, 176; 350/96, 96 B, 411

[56]                  References Cited
                UNITED STATES PATENTS
3,227,032   1/1966   Upton ........................ 350/96 B

| 3,350,183 | 10/1967 | Siegmund et al. | 65/4 |
| 3,397,022 | 8/1968 | Cole | 65/4 X |

FOREIGN PATENTS

| 1,111,419 | 4/1968 | Great Britain | 350/96 B |

*Primary Examiner*—S. Leon Bashore
*Assistant Examiner*—Robert L. Lindsay, Jr.
*Attorneys*—William C. Nealon, Noble Williams and Robert J. Bird ABSTRACT: Optical fibers each having a light-conducting main body section of circular cross-sectional configuration and a pair of elongated, relatively thin light-absorbing filaments extending along and fused to the main body section, one at each of diametrically opposite sides thereof. Image-transfer devices comprised of a multiplicity of lengths of the fibers are formed by juxtapositioning such lengths with diameters thereof which correspond to the diametral positions of light-absorbing filaments on respective main body sections disposed parallel to each other throughout the assembly and with said light-absorbing filaments disposed in spaces between said main body sections.

PATENTED OCT 26 1971 3,615,313
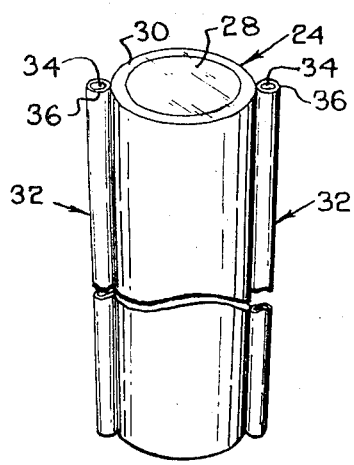
Fig. 1
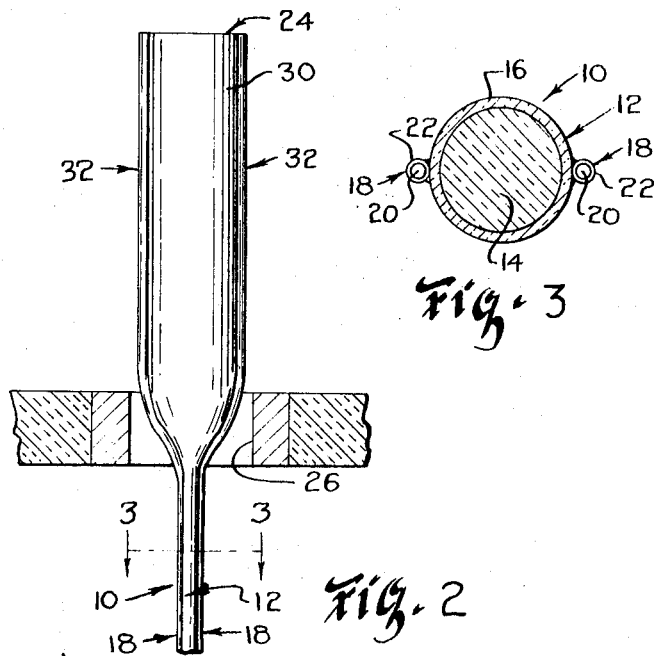
Fig. 2
Fig. 3
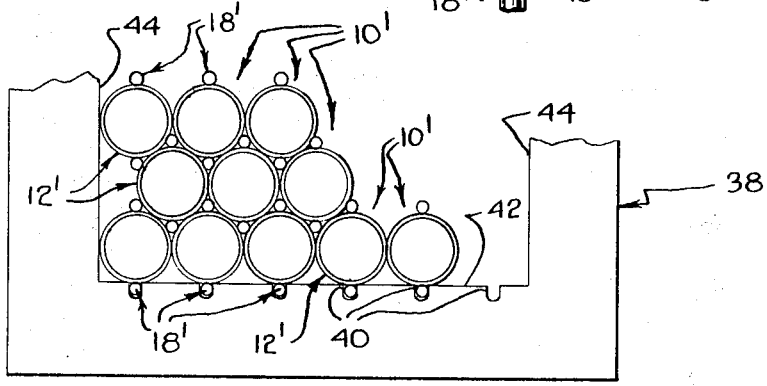
Fig. 4
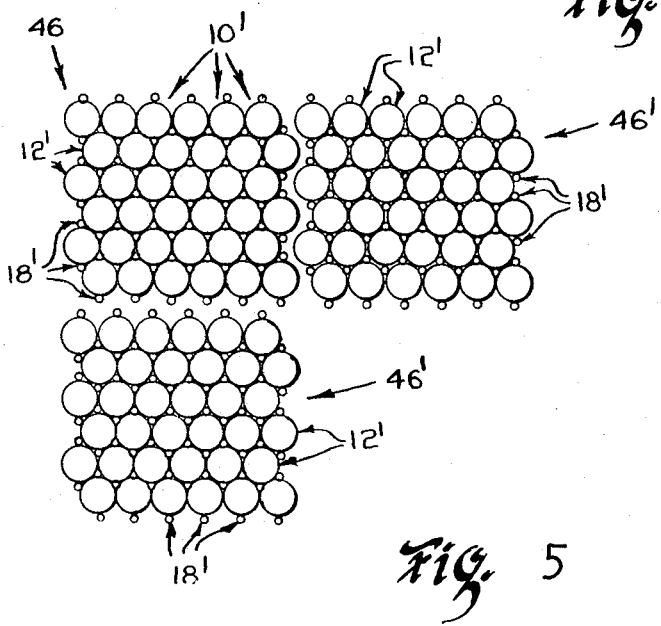
Fig. 5
Fig. 6
INVENTOR.
ROLAND A. PHANEUF
BY
Noble D. Williams
ATTORNEY

METHOD OF MAKING OPTICAL FIBERS, IMAGE-TRANSFER DEVICES

Background Of the Invention

1. Field Of The Invention

Optical fibers with particular reference to the provision of stray-light absorbing means in the fibers, image transfer devices formed thereof and method of making the same.

2. Description Of The Prior Art:

Heretofore, the manufacture of stray-light absorbing fiber optical image conducting devices has required the making and handling of individual relatively long lengths of light-conducting fiber and light-absorbing filament as shown and described in U.S. Pat. Nos. 3,279,903 and 3,247,756, for example. Also, as an alternative to the tedious and time consuming operations of making an assembling individual pieces of fiber and light-absorbing filament, the prior art has suggested the building of light-absorbing elements into core sections of optical fibers in a manner shown and described in U.S. Pat. Nos. 3,387,959 and 3,397,022, for example.

While the latter approach to achieving stray-light absorption in fiber optical image transmitting devices alleviates, at least to some extent, the tedious and time-consuming operations of assembling individual pieces of optical fiber and absorbing filament it, on the other hand, departs from the use of circular light-conducting fiber cores which are more economical to manufacture and are more efficient light transmitters than the rectilinearly shaped optical fiber cores. Furthermore, the making of fibers having light-absorbing elements built into their core sections is attended by its own problems of having to so carefully construct and position the light-conducting and light-absorbing core section relative to each other that whatever advantages may be gained by not having to deal with individual pieces of light-conducting fiber and light-absorbing filament are, to a great extent, negated.

The present invention relates to improvements in stray-light absorbing optical fiber, devices formed thereof and method of making the same. According to this invention stray-light absorbing fiber and multifiber structures may be constructed with exceptional economy and facility with a corollary feature of the multifiber structures being adapted to readily interfit in side-by-side relationship with one another in a manner carrying respective patterns of light-conducting fiber and stray-light absorbing filament uniformly throughout the unit of assembled multifiber structures.

Summary Of The Invention

A stray-light absorbing optical fiber is constructed by placing a rod of high refractive index glass within a tube of glass having a lower refractive index than that of the rod and further placing a considerably smaller rod of light-absorbing material against each of two diametrically opposite sides of the lower refractive index tube. The whole unit is drawn at fusing temperature to a reduced cross-sectional size thereby producing the integral structure of a fiber having a circular main body section of core and cladding glasses with lateral considerably smaller light-absorbing filaments extending along each of two diametrically opposed sides thereof. The light absorbing filaments may be individually clad with a glass similar to that surrounding the fiber core or not, as desired.

Stray-light absorbing multifiber structures are formed by placing a number of lengths of the drawn fiber in superimposed rows with corresponding pairs of light-absorbing filaments of the fibers aligned parallel to each other in transverse meridians of the assembly and disposed in spaces between circular main body portions of fibers in their respectively adjoining rows. Heating and fusing together of the fibers, so assembled, produces a multifiber structure readily adapted to interfit in side-by-side relationship with other similarly formed multifiber structures in such manner that the overall pattern of circular main body sections and light-absorbing filaments of the fibers is continued uniformly across lines of joining of the multifiber structures.

The present invention will be more fully understood by reference to the following detailed description and the accompanying drawing.

Description Of The Drawing

FIGS. 1 and 2 are diagrammatic illustrations of a method of making a stray-light absorbing optical fiber according to principles of this invention;

FIG. 3 is an enlarged cross-sectional view of the fiber taken along line 3—3 of FIG. 2;

FIG. 4 is a fragmentary end view of an assembly of a multiplicity of lengths of the fiber shown in FIGS. 2 and 3 and further illustrates fiber aligning and supporting means which facilitates the forming of the assembly of fibers;

FIG. 5 is an end view of a number of fused fiber assemblies formed by the technique illustrated in FIG. 4 wherein, by slight spacing of these assemblies one from another, an interfitting relationship between adjacent sides of the spaced fused assemblies can be discerned; and FIG. 6 is a diagrammatic illustration of one form of stray-light absorbing fiber optical device embodying the present invention.

Description Of The Preferred Embodiments

In FIGS. 2 and 3 there is illustrated a stray-light absorbing optical fiber 10 of a type produced according to principles of this invention. Fiber 10 comprises a main body section 12 of circular cross-sectional configuration having a core 14 of high refractive index glass surrounded by a cladding 16 of glass of lower refractive index than that of core 14. Integral with main body section 12 at diametrically opposite sides thereof are light-absorbing filaments 18 fused to cladding 16.

In this embodiment of optical fiber 10, light-absorbing filaments 18 each have a core section 20 of light-absorbing filaments 18 each having a core section 20 of light-absorbing glass surrounded by a cladding 22 of a glass similar to that of cladding 16. It should be understood, however, that filaments 18 may be formed entirely of light absorbing material, i.e. without claddings 22, and fused directly to cladding 16 of main body 12.

A method of making fiber 10 is illustrated in FIGS. 1 and 2 wherein it can be seen that a billet 24 of glass having the general configuration of fiber 10 is heated to fusing temperature adjacent one of its ends, e.g. by electrical heating element 26, and drawn to the reduced cross-sectional size of fiber 10.

Referring more particularly to FIG. 1, it can be seen that billet 25 comprises a rod 28 of high refractive index glass placed within a glass tube 30 of relatively low refractive index. Relatively small rods 32 of light-absorbing material are positioned at diametrically opposite sides of tube 30. Rods 32 are illustrated as having core sections 34 of light-absorbing material each clad with a glass 36 similar to that of the glass of tube 30. These rods 32 may, however, each comprise simple an unclad length of light-absorbing material in instances where it is desired that the light-absorbing filaments of fiber 10 be of the unclad type.

Rods 32 of billet 24 may be lightly fused or otherwise attached to tube 30 prior to the drawing of billet 24 or held with mechanical fixtures, not shown, against tube 30 whereby fusion to tube 30 is caused to take place progressively along their lengths during the drawing of fiber 10.

Stray-light absorbing multifiber image-transmitting units of fiber 10 are formed by cutting the fiber into a multiplicity of lengths 10' which are assembled in side-by-side relationship with each other as illustrated in FIG. 4 and fused together as an integral unit. The assembly is made in an aligning and holding fixture 38 having a series of parallel grooves 40 extending along its base 42. Grooves 40 are each of a width and sufficient depth in base 42 as to intimately receive one of the light-absorbing filaments 18' of a length of fiber 10'. The grooves 40 which are immediately adjacent to respective opposite sidewalls 44 of fixture 38 are spaced therefrom a distance approximately equal to a radius of main body section 12' of fiber lengths 10' and intermediate grooves of the series thereof are spaced from one another a distance approximately equal to a diameter of the main body section 12' of fiber lengths 10'.

A first row of fiber lengths 10' is formed along base 42 with one of each pair of absorbing filaments 18' inserted into a corresponding groove 40 whereupon all diameters of fiber lengths 10' which correspond to diametral positions of respective pairs of absorbing filaments 18' automatically become aligned parallel to each other in the first row. A second row of fiber lengths 10' having one of each pair of absorbing filaments 18' keyed into the space between adjoining pairs of main body sections of the fiber lengths in the first row, automatically aligns the diametral positions of pairs o light-absorbing filaments parallel to each other and also parallel to those of the first row. This procedure is repeated a number of time sufficient to produce a desired height of fiber assembly in fixture 38. In this latter respect, the assembly is preferably formed of an equal number of fiber lengths 10' in each row and a number of superimposed rows which is equal to the number of fiber lengths 10' in each row. The assembly is then heated and fused in fixture 38 to form multifiber unit 46 (FIG. 5).

Referring more particularly to FIG. 5, it will be seen that a geometrically uniform pattern of main body sections 12' and absorbing filaments 18' is produced throughout unit 46 by the practice of the assembly procedure described in connection with FIG. 4. More particularly, it is pointed out that this pattern of light-absorbing filaments extends to the very outermost edges of unit 46. Accordingly, a number of additional similarly formed units 46' (only two of which have been shown) may be positioned against unit 46 with automatic interlocking of main body and light-absorbing filaments of fiber lengths 10' whereby the aforesaid uniform pattern of main body sections and light-absorbing filaments is continued across lines of joining between units 46 and 46' as well as throughout all such units. Heating and fusing together of the units will then render the lines of connection therebetween substantially, if not entirely, indistinguishable.

A preselected number of units 46 and 46' assembled and fused together as just described may be cut transversely into relatively thin platelike sections to form stray-light absorbing fiber optical face plates 48 (FIG. 6) which may be used as image receiving and/or emitting faces of electron tube structures and the like. It is, however, not intended that articles produced according to the present invention be in any sense limited to the use just mentioned or of the specific type illustrated in FIG. 6.

All heating, drawing and fusing operations described hereinabove are performed with the observance of appropriate temperatures, drawing rates and annealing and cooling cycles which are currently well-known to the artisan, It should also be understood that, following any one or more of the above described fiber optical assembly operations, the resulting assembly may be heated and redrawn to further reduce the element sizes of fiber main body sections and light-absorbing filaments.

Examples of materials which may be used for light-conducting cores, claddings and light-absorbing filaments of stray-light absorbing fibers of the type disclosed hereinabove are set forth in U.S. Pat. Nos. 3,279,903 and 3,247,756. It should be understood, however, that other materials currently well-known to the artisan may also be used.

I claim:

1. A method of forming a uniformly cross-sectionally patterned assembly of optical fibers each having a circular main body portion and a pair of laterally disposed light-absorbing filaments, one extending along and fused to each of two diametrically opposite sides of said main body portion, said method comprising the steps of:

placing a preselected number of said fibers in a first row with main body portions thereof in direct side-by-side line contact with each other and with particular diameters of the fibers which correspond to the diametral positions of their respective light-absorbing filaments all disposed vertically and in accurately parallel relationship with each other throughout said first row;

forming a second similar row of another preselected number of said fibers directly upon said first row with main body portions in each fiber in direct line contact with main body portions of fibers of said second row further being in direct side-by-side line contact with each other and with one filament of each engaged between each successive pair of main body portions of fibers in said first row whereby respective pairs of light-absorbing filaments of each of said fibers in said second row automatically become vertically aligned in parallel relationship to each other and to similar pairs of light-absorbing filaments of fibers in said first row;

continuing to form additional rows of said fibers in the manner of the forming of said first and second rows until a desired height of said assembly is achieved; and heating and fusing all fibers of said assembly as a unit whereby there is formed a uniform pattern of said main body portions of said fibers in direct contact with each other and having a light-absorbing filament engaged in each and every interstice between said main body portions throughout all transverse meridians of said assembly.

2. The method according to claim 1 wherein each of said rows contains an equal number of said fibers and the number of said rows equals the number of fibers in each of said rows.

3. The method according to claim 2 further including the steps of forming a plurality of said fused assemblies, placing said plurality of fused assemblies in interfitting side-by-side relationship with each other and fusing same together as a unit.